Oct. 18, 1960  R. L. LICH  2,956,516
RAILWAY VEHICLE SIDE BEARING STRUCTURE
Filed May 24, 1956  3 Sheets-Sheet 1

INVENTOR
RICHARD L. LICH
BY Rodney Bedell
ATTORNEY

Oct. 18, 1960 R. L. LICH 2,956,516
RAILWAY VEHICLE SIDE BEARING STRUCTURE
Filed May 24, 1956 3 Sheets-Sheet 2

INVENTOR
RICHARD L. LICH
BY
Rodney Bedell
ATTORNEY

Oct. 18, 1960 — R. L. LICH — 2,956,516
RAILWAY VEHICLE SIDE BEARING STRUCTURE
Filed May 24, 1956 — 3 Sheets-Sheet 3

INVENTOR
RICHARD L. LICH
BY Rodney Bedell
ATTORNEY.

United States Patent Office 2,956,516
Patented Oct. 18, 1960

2,956,516

RAILWAY VEHICLE SIDE BEARING STRUCTURE

Richard L. Lich, Ferguson, Mo., assignor to General Steel Castings Corporation, Granite City, Ill., a corporation of Delaware Filed May 24, 1956, Ser. No. 587,121

4 Claims. (Cl. 105—200)

The invention relates to railway rolling stock and more particularly to the support of a vehicle body upon a swiveling truck. The invention comprises a novel form of side bearing carried by the load-supporting bolsters of the truck and associated with the corresponding portion of the vehicle body underframe, the center of the bolster and the adjacent portion of the vehicle underframe being connected for pivotal action only and being relieved of the load-supporting function.

One of the objects of the invention is to lighten the truck and body framing by supporting the truck bolster and body bolster at the sides of the vehicle, thus avoiding bolster structures heavy enough to transfer the body load from the sides of the vehicle to a center bearing and from the center bearing to the sides of the truck.

Another object is to avoid undesirable friction, wear and noise resulting from swiveling of a truck about the usual center bearing.

Another object is to promote stability of the truck and body bolster both transversely of the vehicle and transversely of the bolsters.

Another object is to facilitate necessary swiveling of the truck on curved track.

These objects are attained by the structure illustrated in the accompanying drawings, in which.

Figure 1:
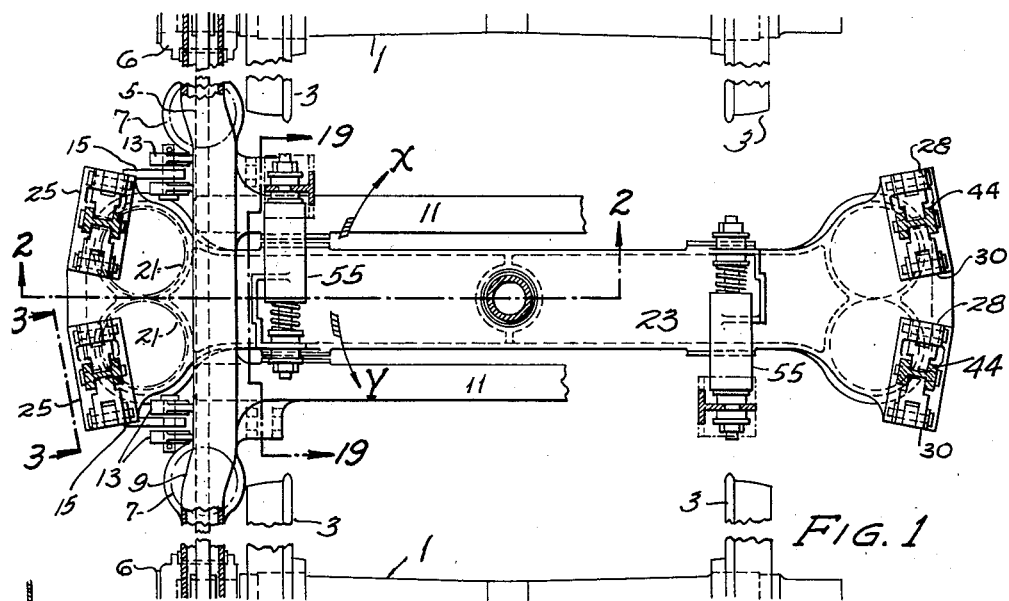
Figure 1 is a top view and horizontal section of a portion of a 4-wheel truck showing its bolster and the side bearings, and is on line 1—1 of Figure 2.
Figure 9:
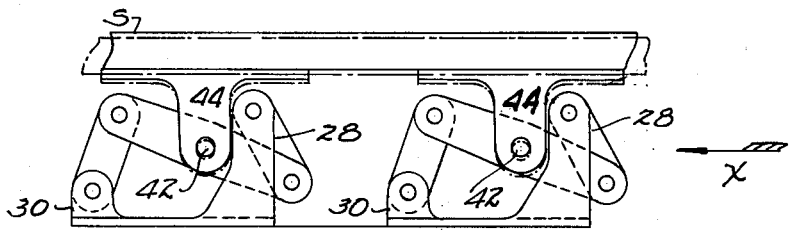

Figure 9 similarly illustrates the side bearings at the opposite end of the bolster and looking toward the right hand side of Figure 1 when the truck has swiveled in the clockwise direction X from its normal centered position.

Figure 8:
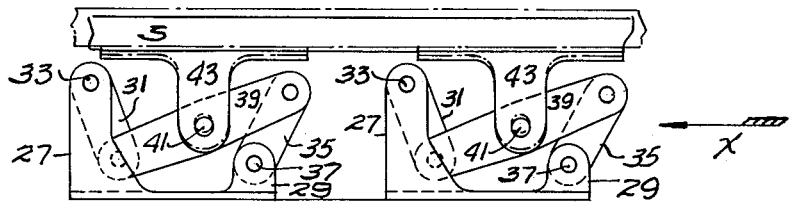
Figure 8 illustrates diagrammatically both of the side bearings, looking toward the left hand side of Figure 1 when the truck has swiveled in a clockwise direction X from its normal centered position.
Figure 10:
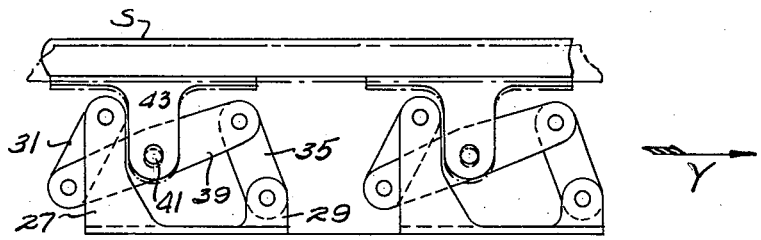

Figure 10 similarly illustrates the side bearings shown in Figure 8 in the relative positions assumed when the truck has swiveled in an anti-clockwise direction Y from its normal centered position.

Figure 11:
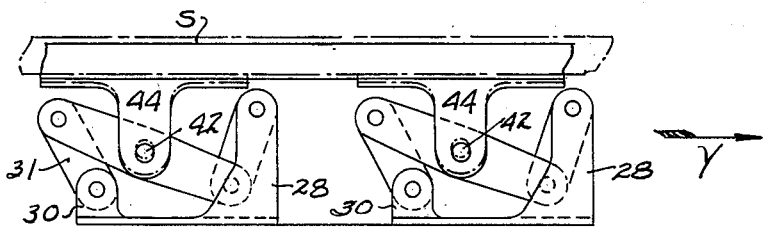

Figure 11 similarly illustrates the side bearings shown in Figure 9 in the relative positions assumed when the truck has swiveled in the anti-clockwise direction Y from its normal centered position.

Figure 12:
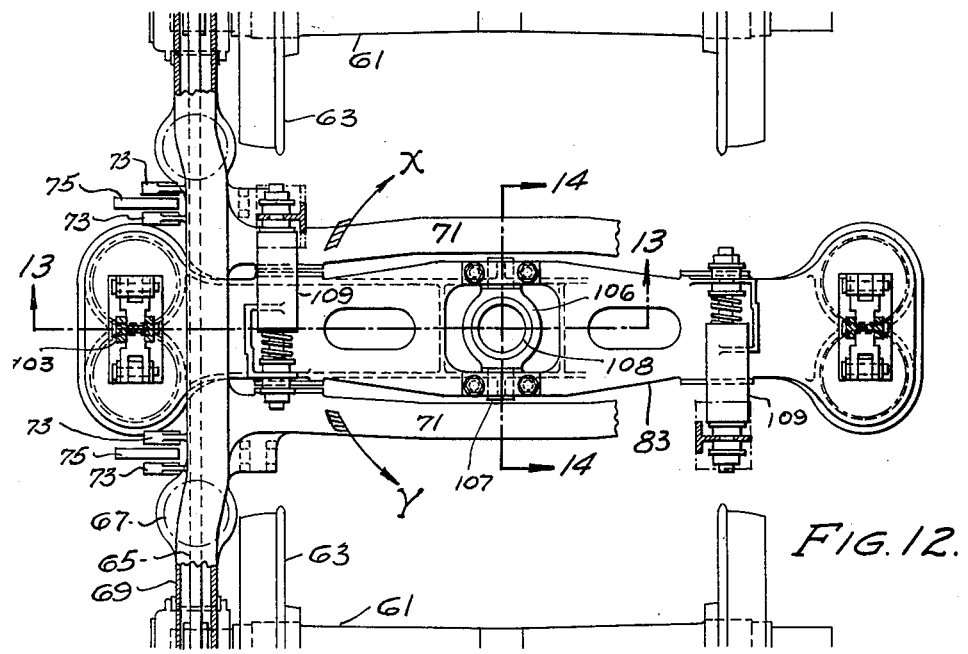

Figure 12 corresponds to Figure 1, but shows another form of the invention embodying a single side bearing at each end of the bolster.

Figure 13:
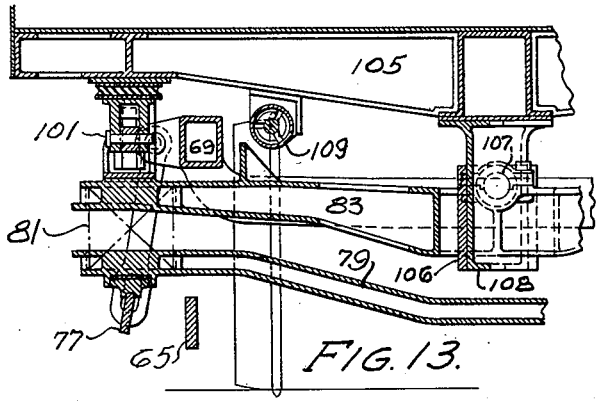

Figure 13 is a vertical transverse section on line 13—13 of Figure 12.

Figure 14:
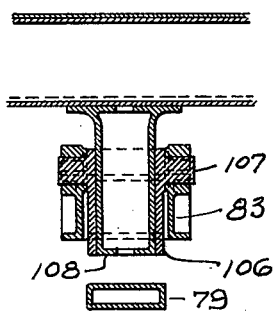

Figure 14 is a detail vertical section on line 14—14 of Figure 12.

Figures 15, 16:
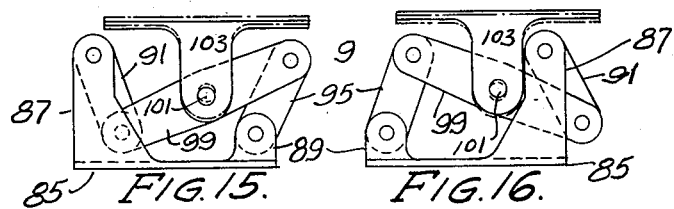

Figure 15 illustrates diagrammatically the side bearing, looking towards the left hand side of Figure 13 when the truck has swiveled in a clockwise direction X from its normal centered position.

Figure 16 similarly illustrates the side bearing at the opposite end of the bolster when the truck has swiveled in the clockwise direction.

Figures 17, 18:
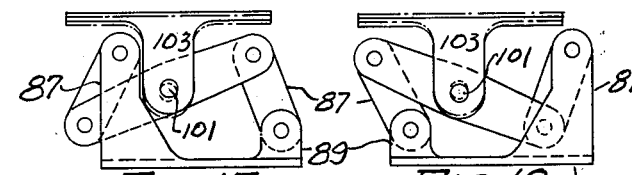

Figure 17 illustrates the parts shown in Figure 15 when the truck has swiveled in an anti-clockwise direction Y from its normal centered position.

Figure 18 illustrates the parts shown in Figure 16 when the truck has swiveled in the anti-clockwise direction from its normal centered position.

Figure 19:
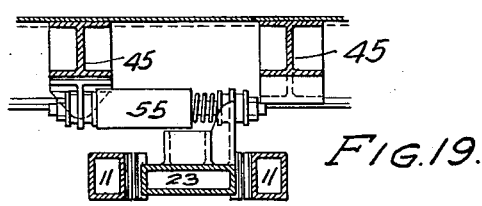

Figure 19 is a detail vertical section on line 19—19 of Figure 1 showing a snubber utilized to maintain the truck in normal centered position when there is no force positively tending to rotate the truck relative to the body.

The truck indicated in the drawings includes spaced axles 1 with wheel 3. Equalizers 5 extend between and are mounted on journal boxes 6 on the ends of the axles and each equalizer mounts coil springs 7. A truck frame preferabl yformed of a one-piece casting includes side members 9 and a pair of transverse transoms 11 spaced apart lengthwise of the truck. Brackets 13 project outwardly from side members 9 and hangers 15 are pivotally suspended from brackets 13 to swing transversely of the truck. A cross bar 17 carried by the lower ends of each pair of swing hangers 15 mounts a spring plank 19 which mounts bolster springs 21 at its ends. A rigid bolster 23 extends transversely of the truck and is supported at its ends upon springs 21.

Mounted on each end of bolster 23 are a pair of vehicle body support devices, one of which is shown in detail in Figures 3, 4, 5, 6 and 7. Each individual support device comprises a base 25 seated on the end of the bolster and elongated transversely of the bolster and lengthwise of the truck and having upstanding brackets 27 and 29 at its opposite ends. Bracket 27 is substantially higher than bracket 29. A normally upright link 31 is pivotally supported at its upper end by a pin 33 to the upper end of bracket 27. A link 35 is pivotally supported at its lower end by a pin 37 to the short bracket 29. A cross bar 39 extends diagonally from the lower end of link 31 to the upper end of link 35 and is pivotally connected at its ends to these links. Intermediate its ends bar 39 forms a bearing mounting a pin 41 which supports a depending bracket 43 fixedly mounted on the lower portion of the vehicle body bolster 45.

The two bracket-link-and-cross-bar devices at each end of the bolster form the sole support for the vehicle body and its load. The truck and body bolsters have a pivotal connetcion 47 with an upright axis at the middle of the truck for the swiveling of the truck on the body, but these parts do not form a support for the vehicle body as is provided by the usual center plate assembly.

Figures 5, 6, 7:
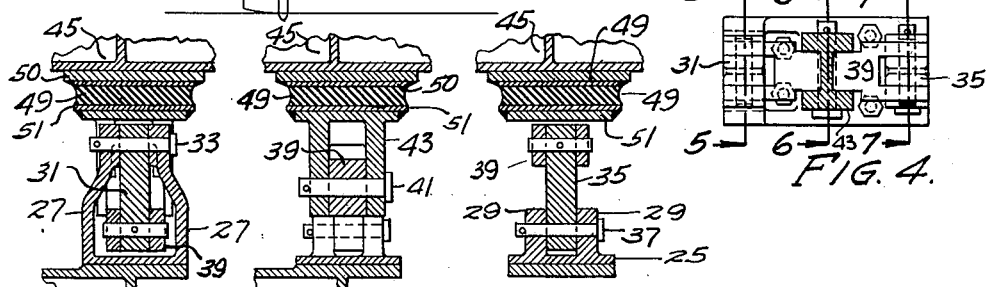
Figure 5 is a vertical transverse section on line 5—5 of Figure 4.
Figure 6 is a vertical transverse section on line 6—6 of Figure 4.
Figure 7 is a vertical transverse section on line 7—7 of Figure 4.
Figure 4:
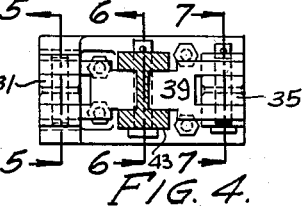
Figure 4 is a horizontal section on line 4—4 of Figure 3.

Preferably, upstanding brackets 27 and 29 comprise spaced webs as best shown in Figures 5 and 7 and depending bracket 43 similarly comprises spaced webs as shown in Figure 6. Also bar 39 has its ends bifurcated to receive the ends of links 31, 35 to which it is pivoted.

Figures 2, 3:
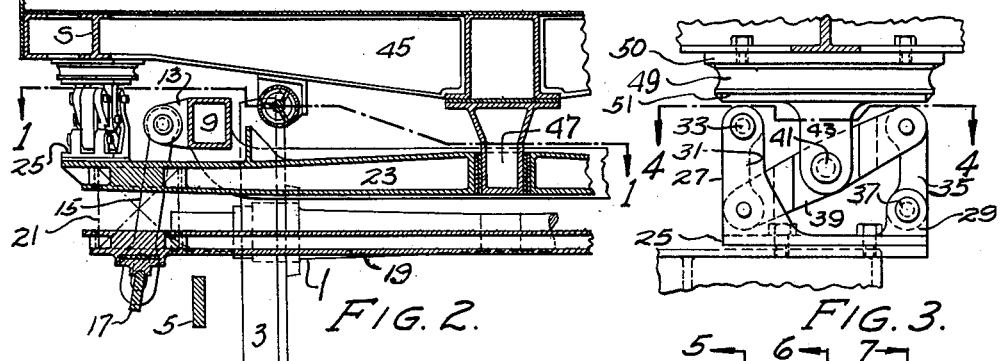
Figure 2 is a vertical transverse section on line 2—2 of Figure 1 showing the associated vehicle body underframe.
Figure 3 is a detailed side view of one side bearing on line 3—3 of Figure 1.

The functioning position of normally upright links 31, 35 is shown in Figure 3. Figure 8 shows the inclined position assumed by links 31, 35 when the truck swivels clockwise from the position shown in Figure 1 and its bolster ends and body support structures move lengthwise of the vehicle body. In this figure, and in Figures 9, 10, 11, the broken lines show the position of the body side sills and bracket 43 when the truck is in its normal centered position relative to the car body. The solid lines show the position of the body side sill and bracket 43 when the truck has swiveled its maximum distance from its normal position.

In Figure 8 the lower end of link 31 swings to the right and upwardly about its pivot support pin 33 while the upper end of link 35 swings to the right and downwardly about its pivot support pin 37. Truck bolster short bracket 29 moves toward body bracket 43 while high bracket 27 moves away from body bracket 43. Accordingly during this movement the corresponding body support pivot elements 41 will be lowered.

At the opposite side of the truck (Figure 9) the short bracket 30 moves away from the body bolster bracket 44 while the high bracket 28 moves toward the bolster bracket and the corresponding body bracket 44 and the body side sill will be raised.

If the truck swivels anti-clockwise the movements of the links and cross bar are reversed. The corresponding positions of the links and body bracket and side sill are shown in Figures 10 and 11 respectively. The raising and lowering of the bolster depends upon whether the pivotal support 41 for bracket 43 moves horizontally toward the upper pivot 33 or toward the lower pivot 37. Links 31, 35 do not move through the same degree of arc, for the same distance upwardly or downwardly, as they would if they remained parallel to each other. Because one end of bar 39 moves upwardly and the other end of the bar moves downwardly, the horizontal distance between pivots 33 and 37 for links 31 and 35 is increased and the level of pivot 41 rises if it approaches the higher pivot 33, and the level of pivot 41 lowers if it approaches the lower pivot 37. Hence the level of brackets 43 at opposite ends of the bolster moves simultaneously upwardly and downwardly respectively.

This provides a desired superelevation of the vehicle body at the outside of a track curve and is due to the fact that all the links pivotally supported at their lower ends are at the same corresponding ends of the supported devices with respect to the fore and aft sides of the bolster.

A rubber pad 49 bonded on opposite sides to plates 50, 51 secured to the body underframe and to bracket 43 respectively, affords the slight rotation between the underframe and bracket needed to accommodate the swiveling of the body bolster on the truck bolster about the central pivot 47.

The raising of one side of the body tends to return the truck to centered position when the swiveling force terminates, but the lowering of the body at the other side tends to resist return movement of the truck. Accordingly, the pivoted link supports for the body offer no substantial resistance to swiveling of the truck to and from its normal centered position. Friction snubbers 55 of the telescoping type each have one end secured to the truck bolster and the other end secured to the body bolster. These snubbers restrain the swiveling of the truck about pivot 47, so that the truck does not oscillate unduly, but the snubbers accommodate necessary relative pivotal movement of the truck and body on curved track.

At all times the vehicle body and the truck are positioned relative to each other transversely and longitudinally of the vehicle by a center pin 47 on body bolster 45 rotatable in a suitable opening in truck bolster 23 and heavy enough to resist acceleration and deceleration forces and transverse shifting forces. The fit between pin 47 and truck bolster will be free enough to accommodate the slight tilting of the body bolster and truck bolster relative to each other transversely of the vehicle due to the different raising and lowering motions described. Tilting of the two bolsters relative to each other lengthwise of the vehicle is resisted by the spaced side bearings at each side of the vehicle.

While longitudinal stability is increased by the use of two side bearings at each side of the truck, the broader aspects of the invention may be embodied in a single pair of tension and compression links at each side of the truck, and such an arrangement is shown in Figures 12–18. The spaced axles 61 with wheels 63, equalizers 65, equalizer springs 67, the truck frame with side members 69 and transverse transom 71, brackets 73, hangers 75, cross bars 77, spring plank 79, bolster springs 81 and bolster 83, are substantially the same as in the truck previously described. A single side bearing or support unit is mounted on each end of bolster 83 and comprises a bracket base 85 with upstanding brackets 87 and 89. Link 91 is suspended at its upper end from bracket arm 87. Link 95 is pivoted at its lower end to bracket 89. Cross bar 99 is pivoted at its ends to the lower end and upper end respectively of links 91, 95. The intermediate portion of bar 99 provides a pivotal support 101 for the depending bracket 103 mounted upon the lower portion of the vehicle body bolster 105.

The side bearing or support unit at the opposite end of the truck bolster has its high arm 87 and low arm 89 directly opposite to the corresponding elements 87 and 89 previously mentioned. The result of swiveling movements of the truck about a central axis will be the same as previously described, that is, lowering the body bolster bracket 103 at one side of the truck and raising it at the opposite side of the truck, thus avoiding resistance to the swiveling of the truck on the body by the supporting structure. With this arrangement each body bolster bracket 103 is on the longitudinal center line of the body bolster and normally on the center line of the truck bolster.

The tendency of the bolster to tilt in one direction transversely of its length at one end of the bolster will be balanced by a corresponding tendency of the bolster to tilt in the opposite direction at the other end of the bolster, but these tendencies are not relied upon to hold the bolster parallel.

An upright sleeve 106 (Figure 14) has horizontal trunnions 107 journaled on truck bolster 83 and slidably receives a center pin 108 on body bolster 105. The wide spacing of trunnions 107 and their bearings and the substantial vertical depth of the interengaging faces of members 106 and 107 and the close fit between them prevent relative tilting of the bolsters lengthwise of the vehicle and maintain the bolster horizontal and avoids undue wear on the engaging surfaces of the sleeve and pin. Trunnions 107 accommodate tilting of the bolsters relative to each other transversely of the truck. Snubbers 109 restrain the truck from undesirable nosing or hunting about the center pin.

Both of the structures described may be applied to any conventional passenger type truck arrangement, and obviously the details of construction may be varied substantially without departing from the scope of the invention. The invention is particularly advantageous when side bearings are positioned outboard of the truck frame side members and closer to the sides of the vehicle than is common practice because the increased distance of the side bearings from the center pivot 47, 107 will result in longer travel of the truck and body side members relative to each other when the truck swivels, which would result in greater wear on the parts if ordinary side bearings are used; accordingly the noise and clearance produced by ordinary side bearing structures would be substantially increased.

The exclusive use of those modifications of the invention coming within the terms of the claims is contemplated.

What is claimed is:

1. A railway vehicle truck bolster comprising a central portion, arranged for cooperation with a vehicle body bolster for swiveling the bolster to a vehicle body about a vertical axis, the truck bolster having end portions, body supporting structure on each bolster end portion only, each body supporting structure including a base part fixed on the bolster end portion and having fixed supports spaced apart transversely of the bolster and at different levels, means movably mounted on said fixed supports to shift transversely of the bolster, a body-carrying element on said means, said means raising said element relative to the fixed part when moving transversely of the bolster in one direction about said axis from a normal centered position and lowering said element relative to the fixed part when moving transversely of the bolster in the opposite direction from said position, the relation between the higher and lower fixed supports at one end of the bolster being the reverse of the relation between the higher and lower fixed supports at the other end of the bolster so that the raising of the body-carrying element at either end of the bolster occurs simultaneouly with the lowering of the corresponding body-carrying element at the opposite end of the bolster.

2. In combination with a railway vehicle truck and a body swiveled thereto about a vertical axis, a truck frame, a truck bolster movable on said frame transversely of the truck having rigid upstanding brackets at each end of the bolster spaced apart lengthwise of the truck and of different heights, the lower brackets being nearer to the adjacent end of the body than the higher brackets, a normally upright link pivoted at its lower end to each of the lower of said brackets, a normally upright link pivoted at its upper end to each of the higher of said brackets, and a bar extending between swinging portions of adjacent links and pivoted thereto at its ends and having a vehicle body supporting pivot intermediate its ends, said brackets being movable with the bolster transversely of said truck frame, and said bars being movable with the vehicle body longitudinally of the truck and relative to the truck bolster by the swinging of said links, said brackets, links and bars forming the sole support for the vehicle body.

3. Structure for mounting a railway vehicle body on the end portions only of a relatively swiveling truck bolster, comprising at each end of the bolster an elongated base with its elongation disposed transversely of the length of the bolster, upstanding brackets on said base spaced apart lengthwise of the base, normally upright links each having a horizontal pivot support on an individual one of said brackets, the pivot axes extending transversely of the length of the base, said pivot supports being at the upper end of one link and at the lower end of the other link, a cross bar inclined to the horizontal with its ends pivotally connected to the swinging ends of said links, said cross bar having a body supporting pivot element intermediate its ends, the inclination of the cross bar at one end of the bolster being the reverse of the inclination of the cross bar at the other end of the bolster.

4. The combination of a railway truck bolster and structure for mounting a relatively swiveling railway vehicle body at opposite ends only of said bolster according to claim 3 in which the cross bars between the links of each device at the same end of the bolster are disposed tangentially to a circle described in a horizontal plane about the center of the bolster.

References Cited in the file of this patent

UNITED STATES PATENTS

| 217,934 | Foss | July 29, 1879 |
| 1,122,330 | Stockowitz | Dec. 29, 1914 |
| 1,257,358 | Janse | Feb. 26, 1918 |
| 1,645,271 | Alben | Oct. 11, 1927 |
| 2,848,956 | Deist | Aug. 26, 1958 |